United States Patent
Kirschner et al.

[11] 3,791,221
[45] Feb. 12, 1974

[54] DISSOLUTION TESTING DEVICE

[75] Inventors: Lawrence Kirschner, Flanders; Thomas Simon, Succasunna; William A. Campbell, Chester, all of N.J.

[73] Assignee: Warner-Lambert Company, Morris Plains, N.J.

[22] Filed: Apr. 7, 1972

[21] Appl. No.: 242,168

[52] U.S. Cl.................. 73/432 R, 23/253 R, 73/53
[51] Int. Cl............................................. B01f 1/00
[58] Field of Search .... 73/432 R, 53; 356/196, 197; 23/230 B, 253 R, 259 R

[56] References Cited
UNITED STATES PATENTS

| | | | |
|---|---|---|---|
| 3,223,486 | 12/1965 | Holl, Jr. et al. | 23/259 R X |
| 3,192,774 | 7/1965 | Simoons | 73/53 X |
| 3,545,864 | 12/1970 | Dibbern | 73/53 X |
| 3,618,395 | 11/1971 | Melliger | 73/432 R |

*Primary Examiner*—Richard C. Queisser
*Assistant Examiner*—Joseph W. Roskos
*Attorney, Agent, or Firm*—James F. Powers, Jr.; Albert H. Graddis

[57] ABSTRACT

The specific disclosure provides a dissolution rate testing device for tablets and capsules comprising a closed chamber having a solution medium therein, a removable holder positioned in the bottom of the chamber for at least one tablet or capsule, and an impeller for circulating the solution medium about the at least one tablet or capsule so that the dissolution rate can be observed.

12 Claims, 2 Drawing Figures

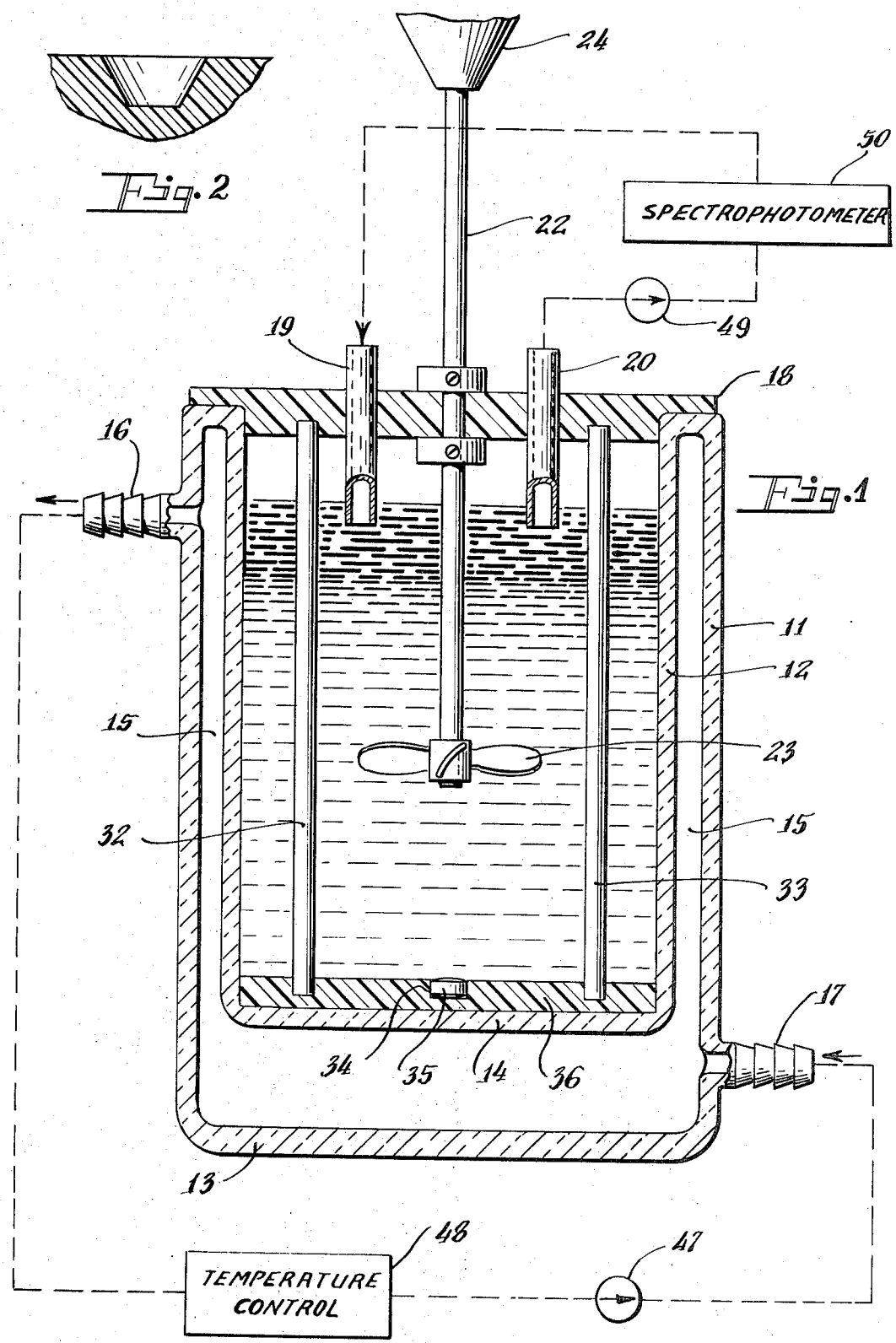

DISSOLUTION TESTING DEVICE

BACKGROUND OF THE INVENTION

1. Field of the Invention

The present invention relates to a system for determining dissolution rates of tablets and capsules. More particularly, the present invention relates to a system for determining the dissolution rate of tablet and capsule dosage forms containing relatively insoluble drugs.

2. DESCRIPTION OF THE PRIOR ART

In the production of dosage forms of therapeutic compositions such as tablets and capsules, it is of importance as one aspect of quality control to produce these products with uniform dissolution characteristics so that reliable absorption rates and effective blood levels of the active therapeutic ingredients can be achieved and maintained. Various factors can affect the dissolution characteristics of tablets and capsules. For example, in the case of tablets, not only the excipients used but also the pressures under which the tablets are formed are of importance. Reliable means for testing the dissolution rates are necessary so that any undesirable variations and compressive force, for example, can be altered before excessive numbers of off-standard tablets are produced. The problem of determining dissolution characteristics is particularly difficult when the tablet or capsule contains relatively insoluble drugs.

SUMMARY OF THE INVENTION

It is an important object of this invention to provide a dissolution rate testing system with parts which are readily interchangeable for use with different size tablets and/or capsules and which can be used with various solvents and at variable temperatures.

Another object of this invention is to provide a dissolution rate testing device system wherein the progress of the entire test procedure is completely visible to the test operator and from which test samples of the solution may be withdrawn as needed.

Still another object of this invention is to provide a dissolution rate testing system wherein the progress of the entire test procedure is continuously monitored by continuously withdrawing samples of solution.

Yet another object of this invention is to provide a dissolution rate testing system wherein the various test parameters utilized can be modified as required for the particular tablet or capsule being tested.

In accordance with the present invention, there is provided a dissolution rate testing device for tablets and capsules comprising a closed chamber containing a solution medium, a removable holder for the tablet or capsule whose solubility is being tested, and an impeller for circuliting the solution medium about the tablet or capsule so that the dissolution rate can be observed.

In accordance with another aspect of the invention, there is provided a dissolution rate testing system for tablets and capsules comprising a testing device including a closed chamber containing a solution medium, a removable holder for maintaining the tablet or capsule whose solubility is being tested in a fixed position, and an impeller for circulating the solution medium in the chamber about the tablet or capsule so that the dissolution rate can be observed. The system also includes means for continuously circulating at a predetermined rate a portion of the solution from the chamber to a monitoring device for continuously generating a signal representative of the dissolution rate.

Other aspects and objects of the present invention will become apparent from the following detailed description.

BRIEF DESCRIPTION OF THE DRAWINGS

FIG. 1 is a cross-sectional view of a dissolution rate testing device in accordance with the present invention; and FIG. 2 is a cross sectional view of a tablet hole.

DESCRIPTION OF SPECIFIC EMBODIMENTS

FIG. 1 shows a specific embodiment of the present invention having a transparent jacketed beaker having an outer wall portion 11 and an inner chamber 12. The outer wall portion 11 and the inner chamber 12 are each closed at their respective bottoms 13, 14 to provide a temperature controlling jacket chamber 15 about the side walls and the bottom of the inner chamber 12. The outer wall portion 11 of the transparent jacketed beaker 10 has an inlet 17 and an outlet 16 in fluid communication with the temperature controlling jacket chamber 15. A fluid such as water is passed through the jacket chamber 15 from the inlet 17 to the outlet 16 at a rate sufficient to maintain the inner chamber 12 at a desired temperature.

A cover 18 encloses the top of the beaker to prevent escape of fluids to the atmosphere. The cover 18 has ports formed therein for inlet and outlet conduits 19, 20. The inlet and outlet conduits 19, 20 are provided to permit periodic or continuous sampling of the contents of the inner chamber 12.

The cover 18 also has a port therethrough for an impeller shaft 22 which has an impeller 23 at the lower end thereof in the inner chamber 12. The shaft 22 is connected at its upper end to a coupling 24 which in turn is connected to a motor (not shown).

The device of the present invention also includes a tablet or capsule holder 36 situated at the bottom of the inner chamber 12 with the side walls thereof frictionally abutting the inner side walls of the inner chamber 12. At least one tablet or capsule hole 34 is formed in the sample member 36 for frictionally maintaining a tablet or capsule 35 therein. A plurality of extension members 32, 33 interconnect the cover 18 and the sample member 36 such that the sample member 36 is removable upon lifting of the cover 18.

To begin a dissolution rate test, the cover 18 and the sample member 36 are frictionally fitted in the jacketed beaker, and a solution medium or buffer is placed in the inner chamber through the inlet conduit 19. A fluid such as water is pumped through the jacketed chamber 15 by means of a pump 47 through a temperature control unit 48 which may heat or cool the fluid. The fluid is passed through the jacketed chamber 15 until a predetermined temperature of the solution medium or buffer is indicated by temperature sensing means (not shown) such as a thermometer. At this time, the cover 18 and the sample member 36 are removed, and a tablet or capsule 35 is fitted in the hole 34 of the sample member 36. The cover 18 and the sample member 36 are then frictionally fitted to the jacketed beaker. The impeller 23 which is maintained at a predetermined height above the holder 31 is then rotated by actuation of the motor (not shown).

Since the jacketed beaker is transparent, initial and complete breakdown of the tablet or capsule can be observed, and timed. Further, the rate of dissolution of the tablet or capsule can be determined by periodically sampling the solution of the inner chamber 12 through the outlet conduit 20, and analyzing the sample to determine the amount of at least one active therapeutic ingredient in the tablet or capsule. Alternatively, the rate of dissolution may be continuously determined by continuously withdrawing a portion of the solution at a predetermined rate through the outlet conduit 20 by a pump 49. The withdrawin solution is then passed to a monitoring device such as a spectrophotometer 50, and then is returned to the inlet conduit 19. The spectrophotometer 50 is set to monitor a particular wave length for an active ingredient in the tablet or capsule, and generates a signal representative of the monitored active ingredient which can be displayed on a strip chart to provide an absorbance versus time display of the dissolution rate of the tablet or capsule.

At the conclusion of each run, the system can be cleaned by flushing the inner chamber 12 and the conduits to the spectrophotometer 50 with a suitable solvent such as ethanol, and then flushing the inner chamber 12 and the conduits to the spectrophotometer with water until a flat base line signal is generated by the spectrophotometer 50.

FIG. 2 shows a tablet hole embodiment suitable for the hole 34. The tablet hole of FIG. 2 is in the form of an inverted truncated cone and provides for self-centering of a tablet along the beveled wall of the hole.

The thus described system provides excellent reproducibility of dissolution rates. It is believed that the excellent reproducibility results from locating the tablet or capsule immediately below the impeller where it is in position of maximum flow which is not hindered by any obstructions. In addition, the impeller 23 can be precisely situated at a predetermined height above the tablet or capsule by adjustment of collars.

What is claimed is:

1. A device for determiining dissolution rates of tablets or capsules comprising, in combination:
   means forming a closed chamber for a solution medium,
   means at the lower portion of said chamber for holding at least one tablet or capsule in a fixed upwardly facing position and in fluid contact with said solution medium,
   means for agitating said solution medium above said holding means at a predetermined rate, and
   means for sampling said solution medium to determine the rate of dissolution of said at least one tablet or capsule.

2. The device of claim 1 wherein said holding means comprises a removable holder having at least one hole in the upper side thereof for said at least one tablet or capsule.

3. The device of claim 2 wherein said agitating means comprises an impeller situated in said solution above said holding means, a shaft extending upwardly from said impeller through the top of said chamber, and means for moving said shaft.

4. The device of claim 3 further comprising means for maintaining said solution medium at a predetermined temperature.

5. The device of claim 2 wherein said at least one hole has an inverted conically shaped side wall.

6. The device of claim 1 wherein said sampling means comprises conduit means for removing a sample of said solution at predetermined intervals.

7. The device of claim 1 wherein said sampling means comprises means for continuously sampling said solution at a predetermined rate.

8. The device of claim 7 further comprising means operatively connected to said sampling means for generating a signal representative of the amount of an active ingredient in said at least one tablet or capsule.

9. The device of claim 7 further comprising means operatively connected to said sampling means for generating a display representative of the rate of dissolution of said at least one tablet or capsule.

10. The device of claim 9 further comprising means for maintaining said solution medium at a predetermined temperature.

11. The device of claim 1 further comprising means for maintaining said solution medium at a predetermined temperature.

12. A device for determining dissolution rates of tablets or capsules comprising, in combination, a container for a solution medium,
   a passageway about the periphery of said container through which a fluid flows,
   means connected to said passageway for controlling the temperature of said fluid,
   a holder comprising a cover for said container, a sample member having at least one hole in the upper side thereof for said at least one tablet or capsule positioned within and at the bottom of said container, and a plurality of elongated support members interconnecting said cover and said sample member, whereby removal of said cover removes said sample member from said container,
   a shaft extending vertically through said cover of said container,
   an impeller at the lower end of said shaft for agitating said solution medium above said sample member, and
   motive means operatively connected at the top of said shaft.

* * * * *